United States Patent [19]
Bell, Jr.

[11] 3,809,848
[45] May 7, 1974

[54] DIGITALLY CONTROLLED POWER SUPPLY FOR ELECTRICAL DISCHARGE MACHINING APPARATUS

[75] Inventor: Oliver A. Bell, Jr., Mooresville, N.C.

[73] Assignee: Colt Industries Operating Corp., New York, N.Y.

[22] Filed: Mar. 16, 1973

[21] Appl. No.: 341,981

Related U.S. Application Data

[63] Continuation-in-part of Ser. No. 314,997, Dec. 14, 1972.

[52] U.S. Cl............................. 219/69 C, 219/69 P
[51] Int. Cl............................................ B23k 9/16
[58] Field of Search........................ 219/69 C, 69 P

[56] References Cited
UNITED STATES PATENTS
3,604,885  9/1971  Inoue................................ 219/69 P
3,624,337  11/1971  Kauffman......................... 219/69 P Primary Examiner—J. V. Truhe
Assistant Examiner—Hugh D. Jaeger
Attorney, Agent, or Firm—Hawke, Gifford, Patalidis & Dumont

[57] ABSTRACT

A digitally controlled power supply for providing machining power pulses of predetermined ON-OFF time duration. Included in the power supply circuit are separately presettable ON time and OFF time switches. A single counter is used for controlling in a precise manner the duration of both ON time and OFF time. Intermediate the ON-OFF time selection switches and the counter there is provided a data selector stage for enabling the connection and countdown of either the ON time or OFF time switches. Also included in the control circuit is the means for providing a pulse responsive to gap break-down at the beginning of each individual machining power pulse to enable the operation of the ON time switch and the associated ON time counter stage.

24 Claims, 1 Drawing Figure

PATENTED MAY 7 1974
3,809,848
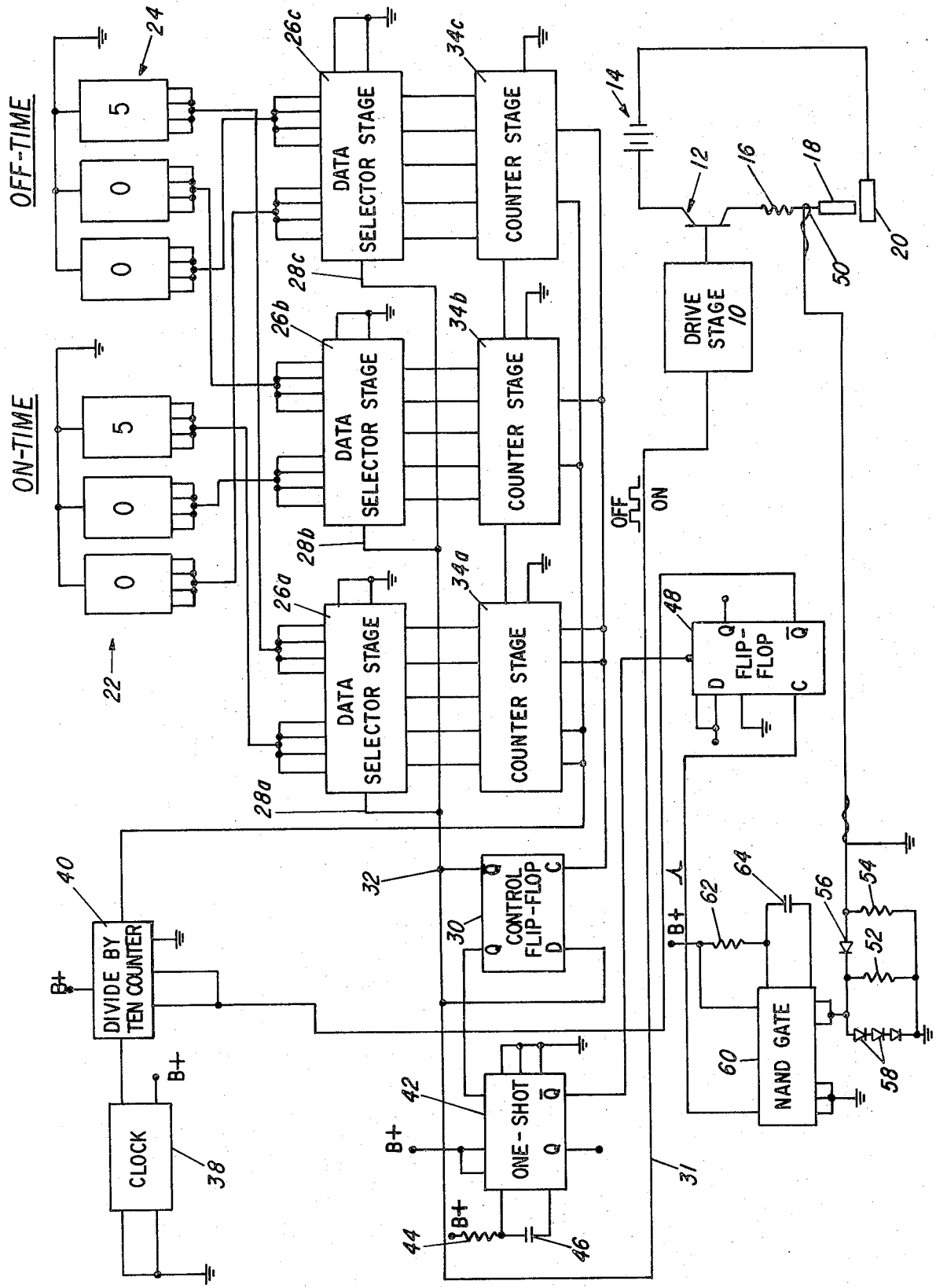

DIGITALLY CONTROLLED POWER SUPPLY FOR ELECTRICAL DISCHARGE MACHINING APPARATUS

REFERENCE TO RELATED APPLICATIONS

This application is a continuation-in-part of U.S. Pat. application Ser. No. 314,997, filed on Dec. 14, 1972 for "Method and Apparatus for Electrical Discharge Machining" filed on behalf of Oliver A. Bell, Jr.

BACKGROUND OF THE INVENTION

The field to which the present invention relates is that generally known as electrical discharge machining, sometimes hereinafter referred to as EDM, in which material is removed from an electrically conductive workpiece by the action of electrical gap discharges occurring between a tool electrode and the workpiece. A dielectric coolant fluid is circulated and recirculated through the gap, usually under pressure, throughout the machining operation. An electrode or a workpiece servo feed system is used to provide relative movement and thus maintain an optimum gap spacing between the electrode and workpiece as the workpiece material is being removed.

It is important to the process of electrical discharge machining that the machining power pulses provided to the gap be of closely and precisely controllable ON-OFF time and frequency to insure repeatability of results and to provide appropriate cutting action for the type of operation being carried on. For example, with a roughing type machining operation, relatively low frequency, high current magnitude pulses would be used for cutting. With a finishing type machining operation, relatively high frequency, lower current magnitude pulses would be employed. Various types of pulse generators, which have this capability and adjustability, have been developed and are in current commercial use for electrical discharge machining. One commonly used type of electrical discharge machining power supply includes as the principal part of its machining power pulse generator an astable multivibrator in which ON-OFF time and frequencies are controlled and preset by a ganged capacitor and resistor arrangement. One example of this type of pulse generator is shown and described in Sennowitz U.S. Pat. No. 3,649,802, issued on Dec. 28, 1970 for "Protective System for Electrical Discharge Machining Power Supply Circuit," which patent is of common ownership herewith. Other types of pulse generators are in use which include various arrangements and combinations of astable multivibrators, oscillators and the like to provide for precise control of the machining power pulse duration and frequency.

It is essential in any electrical discharge machining power supply that the operator be able to preset the pulse ON-OFF time and frequency. It is likewise important that he be informed of the exact setting at which the equipment is operating. It has further been found to be advantageous to provide a timing and pulse initiating circuit which has a controlled relationship to the initial gap breakdown occurring for each pulse generated so that uniform content power pulses may be assured. The present invention includes a circuit for responding to gap breakdown in such way as to properly control the inception of each machining power pulse, and particularly to initiate the operation of the ON time associated counter, which in turn is followed by the operation of the OFF time counter.

SUMMARY OF THE INVENTION

The present invention will be seen to provide an EDM pulse generator, particularly adaptable for controlling in a precisely accurate manner the operation of one or a bank of electronic switches which have their power conducting electrodes connected typically between a DC power supply and the machining gap for providing the machining power pulses.

The present invention, while it discloses as a preferred embodiment a circuit including transistors as the electronic switches, is not limited to the use of this particular type of switch. By substitution and minor revision of the circuits, it will be possible for one skilled in the electronic art to substitute other electronic switches for the transistors. By "electronic switch," I mean any electronic control device having two or more electrodes comprising at least two principal or power conducting electrodes effective to control current flow in the power circuit, the conductivity between the principal electrodes being controlled by a control electrode within the switch or by interruption or change of polarity of voltage applied to one of the principal electrodes, whereby the conductivity of the power circuit is controlled statically or electrically without movement of any actual mechanical element within the switch. Included in this definition by way of example but not limitation are electronic tubes, transistors, silicon controlled rectifiers and similar semiconductor devices.

The electronic output switches in the circuit of the present invention are controlled in their conduction by a combination of transistor-transistor logic (TTL) type integrated circuits of medium scale integration and complexity, such as for example the several types now made and sold by the National Semiconductor Corporation of Santa Clara, Calif. Such circuits are available in a variety of combinations for use in the numerical control and computer industry and the incorporation of such devices in the circuits of the present invention serves to reduce their overall cost and add to their reliability of operation.

BRIEF DESCRIPTION OF THE DRAWING

The present invention, which will be fully described in the appended specification, is illustrated schematically and diagrammatic by the accompanying drawing, in which: the drawing is a combined schematic, partially block diagrammatic showing of the preferred embodiment of the invention.

DESCRIPTION OF THE PREFERRED EMBODIMENT

The drawing shows the individual parts of the EDM pulse generator in block diagrammatic form as they are used to provide a triggering output pulse train to a drive stage 10, one or more of which stages may be used as required to provide pulse shaping and amplification to the multivibrator output pulses and then to provide the triggering pulses to the base of one or more output transistor switches 12, as shown at the lower right-hand corner of the drawing. The output switch 12 is incorporated as an NPN transistor having its collector connected to the positive terminal of the main DC power supply 14 and its emitter connected through a series current limiting resistor 16 to the tool electrode 18.

The gap machining circuit is completed by a lead connected from the minus terminal of the DC power source 14 to the workpiece 20. The polarity illustrated in the drawing is that known as "reverse polarity," which form of polarity is commonly used with graphite type electrodes and certain workpiece materials. It will be understood that the opposite polarity, sometimes known as "standard polarity," with the electrode minus and the workpiece positive, may be used for other desired combinations of electrode and workpiece. In any case, the reversal of polarity connections and the incorporation of a PNP switch in place of the NPN output transistor switch 12 would be readily apparent to one skilled in the art.

Included in the digital multivibrator are the ON time and OFF time switches which include units, tens and hundreds settins in each and are preset in accordance with the ON time and OFF time required. In the present instance, the settings are in 1 to 999 microseconds. The switches 22 and 24 are preferably binary coded decimal thumbwheel switches which provide a visual readout display for the operator, enabling him to be aware of the settings at which machining is being carried out. Also included in the digital multivibrator is an intermediate quadruple two input data selector stage 26a, 26b and 26c as shown. The data selector stage in each case is capable of accepting the two separate 4-bit binary coded decimal input data as preset by the ON time switch 22 and the OFF time switch 24. One type of quadruple dual input data selector which may be used in connection with the present invention is that known as Model N74157, which is manufactured and sold commercially by the National Semiconductor Corporation of Santa Clara, Calif.

There is thus provided a single data select input through leads 28a, 28b, 28c which selects either the ON time switch preset data on switch 22 or the OFF time preset data on switch 24, with the output being either high or low with respect to the control flip-flop 30 output at point 32, as will be more fully explained hereinafter.

The next following stage to the data selector stage 26 is a decimal counter stage including the units, tens and hundreds sections, identified respectively by the numerals 34a, 34b and 34c. According to the ON or OFF time switch setting selected through the data selector stages, 26a, 26b, 26c, there will be provided an appropriate output from the counter stages 34a–c. The three binary coded decimal counters may be of the type MC 4016 currently manufactured and commercially available from the Motorola Semi-conductor Products, Inc. of Phoenix, Ariz. The counters in the drawing are shown cascaded to provide the three digits as preset on the switches 22 and 24.

The source of high frequency clock pulses is provided by a suitable clock pulse source 38 shown at the upper left-hand portion of the drawing. The clock 38 is a 10 megaHerz clock and a following divide-by-ten counter 40 is included in the circuit, the output of which provides the three digit counter stages 34a, 34b and 34c with an accurate 1 megaHerz clock pulse source. It will be understood that the decimal counters 34a–c may be optionally of the count-down or count-up type. Also included in the digital multivibrator is the control D flip-flop 30 already referred to, which is operated by a one-shot multivibrator stage 42. The one-shot multivibrator stage 42 is shown with an externally connected timing circuit, which includes a resistor 44 and a capacitor 46.

A second D-type flip-flop 48 is included in the circuit which has an output from its $\overline{Q}$ terminal to control the operation of the divide-by-ten counter stage 40.

Also shown is a current sensing transformer 50, which is coupled to the gap input lead proximate the tool electrode 18 and includes a pulse forming network and divider stage including resistors 52 and 54 and a signal diode 56. A diode string 58 is connected to ground. The signal from the diode 56 is provided as an input to a nand gate 60, which provides an output to the second D flip-flop 48. The nand gate 60 likewise has an external timing network which includes a resistor 62 and a capacitor 64.

DESCRIPTION OF OPERATION

The cycle of operation of the digital multivibrator will be described with reference to the time at which the ON time period has just been terminated in accordance with the time duration preset on the ON time switch 22. The output of the control flip-flop 30 from its $\overline{Q}$ terminal changes to a low state thus providing machining gap turn off. When the output from the control flip-flop 30 goes to a low state at point 32, then the data selector input through leads 28a, b and c to the data selector stages 26a, b and c serve to select the set of preset 4-bit information as already set on the OFF time switch 24. The turn off of the arc is provided when the output is low at point 32, which also represents the voltage being passed through the lead 31 to the intermediate drive stage 10. The representative wave form suitably labeled OFF and ON is illustrated on the lead 31. With the drive signal insufficient to trigger the drive stage and accordingly the output switch 12 into conduction, the gap remains OFF during the completion of the OFF time count predetermined by switch 24.

When the counters 34a, b and c have completed their OFF count, an output from those counters to the control flip-flop 30 changes its state again so that the output from the $\overline{Q}$ terminal and at point 32 is again changed. However, the leading edge of the status transition of the control D flip-flop going from low state to high state triggers the one-shot stage 42, which in turn clears the second D flip-flop 48. This results in an output from the second D flip-flop 48 to the divide-by-ten counter stage 40, which inhibits the clock pulses being furnished to the counter 34 from the clock source 38.

Thus, with the digital multivibrator maintained in the last described state, the arc is on and the ON time counter as preset by the ON time switch 22 is inhibited. However, when the next following arc strikes, it is sensed by the current sensing circuit, including the current sensing transformer 50 which provides a signal through the network including the signal diode 56. This signal is gated through the nand gate 60 and it changes the output from the second flip-flop 48 from inhibit to enable with respect to the divide-by-ten counter stage 40. The ON time counter 34, as selected by the data selector stage 26a, 26b and 26c, now begins its ON count cycle.

Accordingly, it will be seen that the digital multivibrator provided by the present invention has an ON time period in each case which begins with the first arc ignition, thus insuring a constant ON time period during each machining power pulse furnished to the gap.

The output of the control D flip-flop 30 will thus be seen to comprise two separately effective outputs, one through lead 31 to provide the ON-OFF triggering pulse for the drive stage 10 and finally to the output switch 12, and at the same time a second output which properly, according to its high or low state, controls the data selector stages 26a, b and c to select either the ON time data for count or the OFF time data for count.

The advantages of the system provided by my invention will become apparent from the simplicity and reliability of the control system and of the components used in the circuit. It will be understood that the gap voltage and the duration of machining power pulses to the gap, if not controlled, would vary widely because of constantly differing conditions in the gap which arise from changes in the gap spacing, the degree of contamination in the gap, voltage fluctuations and the like. This problem of pulse duration and frequency is solved by the present invention through the provision of precisely controllable machining power pulses in which the ON time is incrementally preset and in each case begins coincidental with the gap break-down. At the end of the ON time pulse, the OFF time portion again is precisely controlled through the preset operation of the OFF time switch 24 and its associated decimal counter stages 34a–c. At the end of the OFF time, there is again provided an ON pulse, with the ON time duration again commenced only when the gap break-down is sensed.

It will thus be seen that the present invention provides a digital type multivibrator for electrical discharge machining which takes into account the conditions at the gap and initiates precise timing and control of machining power pulses through exact control of their ON and OFF time.

What is claimed is:

1. In an electrical discharge machining apparatus including an electronic output switch and a power source operatively connected to a machining gap for providing machining power pulses of precisely predetermined ON-OFF time duration thereto, a digital type machining power pulse circuit including an ON time switch and an OFF time switch; means for presetting incrementally the time of operation of each of said switches, one independently of the other; a counter connectible selectively to one of the aforesaid ON and OFF time switches; an input data selector state coupled intermediate both said switches and said counter respectively; a means coupled to said gap and responsive to each gap breakdown for providing a pulse to enable the operation of said ON time generator; and a bistable means operatively connected to said last means for selectively connecting the ON and OFF time switches through the data selector means to said counter to provide the successive, digitally predetermined ON-OFF time triggering pulses to the output switch.

2. The combination as set forth in claim 1 wherein a single clock pulse source is coupled to said decimal counter stages to provide their operation in the successive ON and OFF time count modes.

3. The combination as set forth in claim 1 wherein said bistable means comprises a control flip-flop having two outputs, one coupled to the control electrode of said output switch through at least one intermediate drive stage and the other connected to the data selector stage for controlling its operation.

4. The combination as set forth in claim 1 wherein said means for presetting the ON-OFF times respectively comprise binary coded decimal switches of the thumbwheel type.

5. The combination as set forth in claim 1 wherein said bistable means provides a relatively high output to initiate the operation of said selector stage and the selection of said ON time input data and wherein it further provides a relatively low output to provide selection of said OFF time input data.

6. The combination as set forth in claim 1 wherein a second flip-flop is included, said second flip-flop having an output operable to inhibit passage of the clock pulse to said counter stages at the end of each OFF time count.

7. The combination as set forth in claim 6 wherein said means coupled to the gap is operable to change the state of said second flip-flop from inhibit to enable to provide cycling of the ON time counter.

8. The combination as set forth in claim 7 wherein said means for sensing breakdown of the gap includes a current sensing transformer operatively connected to said circuit intermediate the output from said output switch and the machining gap.

9. In an electrical discharge machining apparatus including an electronic output switch and a power source operatively connected to a machining gap for providing machining power pulses of precisely predetermined ON and OFF time duration thereto; a digital type machining power pulse circuit including an ON time switch and an OFF time switch; means for setting incrementally in a visual display the time of operation of each of said switches, one independently of the other; a single counter capable of being selectively coupled to one of the aforesaid ON and OFF time switches; a data input selector stage coupled intermediate said switches and said counter respectively; a means operably connected to said gap and responsive to each gap breakdown for providing a pulse to enable the operation of said ON time generator; and a flip-flop operably connected to said last mentioned means for selectively connecting the ON and OFF time switches each to its data selector means to the counter to provide successively digitally predetermined ON-OFF time duration to said output swtich.

10. The combination as set forth in claim 9 wherein said ON-OFF time switches comprise in each case a binary coded decimal thumbwheel switch, one for setting the ON time and the other for presetting the OFF time.

11. The combination as set forth in claim 10 wherein said data selector means comprises a quadruple two-input data selector stage and said counter comprises a binary coded decimal counter.

12. The combination as set forth in claim 9 wherein said electronic output switch comprises at least one transistor having its power electrodes connected between a main machining DC source and said gap.

13. The combination as set forth in claim 9 wherein said means responsive to each of said gap breakdowns comprises a current sensing transformer operably connected between one of the power conducting electrodes of said output switch and said gap.

14. The combination as set forth in claim 9 wherein said bistable means has its output operably connected to said data selector stage for controlling the connection of the appropriate one of said data selector stages to said counter and said biastable means further has its output coupled operatively to the control electrode of said output electronic switch for triggering it ON and OFF.

15. The combination as set forth in claim 14 wherein a second flip-flop is operably connected between said means, said second flip-flop responsive to each gap breakdown for controlling the operation of said counter and inhibiting clock pulses to said counter until gap breakdown occurs.

16. The combination as set forth in claim 15 wherein a high frequency clock pulse source is coupled to said counter through a divide-by-ten stage and said second flip-flop is coupled to said last mentioned stage for holding it OFF until occurrence of the next following gap breakdown pulse.

17. In an electrical discharge machining apparatus including an electronic output switch and a power source operatively connected to a machining gap for providing machining power pulses of digitally predetermined ON-OFF time duration thereto, a digital type machining power pulse circuit including separately settable ON time and OFF time switches; a counter selectively connectible to either of the aforesaid ON and OFF time switches; a data input selector stage connected intermediate said switches and said counter stage respectively; means coupled to said gap and responsive to each gap breakdown; and a bistable means operably connected to said last mentioned means and having a pair of outputs, one of its outputs operably connected to said data input selector stage for connecting one of said ON-OFF time switches to the counter stage, and the other of its outputs operably connected to the control electrode of said electronic output switch for controlling its ON-OFF operation.

18. The combination as set forth in claim 17 wherein said second output of said bistable means is connected to the control electrode of said output electronic switch through an intermediate amplifier and wave form shaping drive stage.

19. The combination as set forth in claim 17 wherein said ON time switch and said OFF time switch comprise in each case a thumbwheel type switch having its setting visually displayed to the operator of said apparatus.

20. The combination as set forth in claim 19 wherein said switches comprise in each case a multiple stage binary coded decimal switch, wherein said counter comprises a like number multiple stage binary coded decimal counter, and wherein a separate clock pulse source is connected to said counter to control its operation.

21. The combination as set forth in claim 20 wherein said means responsive to each gap breakdown includes a nand gate stage coupled to said gap through a current sensing transformer.

22. The combination as set forth in claim 21 wherein a second bistable means is coupled intermediate the output of said nand gate and said counter for inhibiting its operation prior to the occurrence of gap breakdown and thus inhibiting the operation of said counter.

23. The combination as set forth in claim 22 wherein a one-shot multivibrator is coupled intermediate said second bistable means and said first bistable means for triggering it into operation.

24. The combination as set forth in claim 23 wherein said first and said second bistable means comprise in each case a controlled D-type flip-flop.

* * * * *